United States Patent [19]
Miller et al.

[11] Patent Number: 5,134,713
[45] Date of Patent: Jul. 28, 1992

[54] COPROCESSOR DETECTION CIRCUIT

[75] Inventors: Joseph P. Miller; Mark Taylor; Mike E. Tullis, all of Houston, Tex.

[73] Assignee: Compaq Computer Corporation, Houston, Tex.

[21] Appl. No.: 354,446

[22] Filed: May 19, 1989

[51] Int. Cl.⁵ .......................................... G06F 15/16
[52] U.S. Cl. .................. 395/800; 364/228.6; 364/230.4; 364/266
[58] Field of Search ... 364/200 MS File, 900 MS File; 395/800

[56] References Cited

U.S. PATENT DOCUMENTS

| | | | |
|---|---|---|---|
| 4,547,849 | 10/1985 | Louie | 364/200 |
| 4,598,356 | 7/1986 | Dean et al. | 364/200 |
| 4,926,318 | 5/1990 | Nakayama | 364/200 |
| 4,979,102 | 12/1990 | Tokuume | 364/200 |

OTHER PUBLICATIONS

Intel Corp., 1 Microprocesor and Peripheral Handbook, Microprocessor 4-1 to 4-28 and 4-55 to 4-88 (1988).
Intel Corp., 1 Microprocessor and Peripheral Handbook, Microprocessor 4-129 to 4-165 (1988).
Compaq Computer Corporation, 1 Compaq Deskpro 386/20 Personal Computer Technical Reference Guide 2-108 to 2-122 (1987).

Primary Examiner—Gareth D. Shaw
Assistant Examiner—Dennis M. Butler
Attorney, Agent, or Firm—Pravel, Gambrell, Hewitt, Kimball & Krieger

[57] ABSTRACT

A latch circuit receiving the system reset signal and the error signal from a coprocessor provides an output indicating the presence of the coprocessor. The latch circuit provides the output for computer systems which cannot connect the coprocessor error signal to a coprocessor error input on the processor.

7 Claims, 2 Drawing Sheets

| TIME | OUTPUT 36 | OUTPUT 28 |
|---|---|---|
| T1 | L | H |
| T2 | L | H |
| T3 | L | H |
| T4 | H | L |
| T5 | H | L |
| T6 | L | H |
| T7 | L | H |

COPROCESSOR DETECTION CIRCUIT

BACKGROUND OF THE INVENTION

1. Field of the Invention

This invention relates to personal computers and more particularly to personal computers which utilize a microprocessor such as the Intel 80386 and which are also adapted to use a complementary numeric coprocessor circuit for performing certain processor functions in parallel with the system primary microprocessor.

2. Description of the Related Art

The field of personal computers has rapidly developed in response to increased consumer demand and business use. Today many functions and computations formerly too complex for any computer system other than mainframe, large scale systems are being performed on personal computer systems.

The increase of the complexity and capability of systems has followed the development of the microprocessor, the primary component in any personal computer system. One microprocessor family which has been widely utilized is the 8088, 80286 and 80386 series manufactured by Intel. Each of these successive developments provided enhanced processor speed and capability. Fairly early in the development of this and other microprocessors it was recognized that many of the time consuming numeric computations could be performed by a companion processor or coprocessor operating in parallel with the primary processor. The primary advantage achieved was that the coprocessor would operate essentially independently to process time consuming computations such as complex mathematical computations, leaving the processor free to more expeditiously control program execution, input/output control and other requirements of the computer system.

While these coprocessor circuits were highly desirable in some applications, they were relatively expensive and not desirable for al personal computer systems. Hence, the industry developed personal computer systems in which coprocessors could be added as an option at the time of manufacture of the system or as an add-on or expansion for those applications where the cost of the additional processor was justified.

Since the coprocessor was an optional feature, the primary microprocessor continued to be designed as a full-function processor capable of performing all the tasks which would be delegated to the coprocessor if available. It therefore was necessary that the microprocessor system include some means of detecting whether a coprocessor was present in the system.

In the past, several methods or means have been utilized to signal or indicate the presence of a coprocessor circuit. In most systems which utilized Intel coprocessors such as the 80287 and 80387, which are companion circuits for the 80286 and 80386 processors, the detection means was a switch manually set by the user to indicate whether a coprocessor was installed. The status of this switch was read by the processor under program control executed upon system initialization.

Alternatively, in the case of coprocessors such as that manufactured by Weitek and used with Intel processors, a separate pin was provided on the coprocessor circuit so that when the coprocessor was installed a designated output from the coprocessor socket was taken to a low voltage active state. The state of this output terminal was read by the processor under program control during system initialization.

The Intel 80386 processor was designed to accommodate either the 80287 or 80387 coprocessors. As originally designed by Intel, the 80386 identified the type of coprocessor, as distinguished from the presence of a coprocessor, by sampling the ERROR* signal provided from the coprocessor some time after the trailing, falling edge of the system reset signal (active high) and before executing the first coprocessor instruction. After a hardware reset, the 80287 keeps its ERROR* output at an inactive high voltage level. The 80387 ERROR* output is maintained at an active low level after reset. In order to function as designed, the ERROR* output from the 80287 or 80387 was to be connected directly to the ERROR* input on the 80386 processor.

As designed by Intel, it was intended that the 80386 processor would read the ERROR* input and store its state in the ET bit of the processor's control register zero. If the ET bit was low, indicating an 80387 coprocessor, the processor would employ a thirty-two bit protocol for communicating with the coprocessor. If the ET bit was high, a sixteen bit protocol was utilized.

While this procedure, if followed, provided a satisfactory signal indicating a 80387 coprocessor was present (active low level), the high level signal was ambiguous, since a high level could also signify that no coprocessor was attached or that a coprocessor was attached in a non-standard manner.

To resolve this ambiguity, prior systems have required a switch to be manually set and its status determination included as part of system initialization software such as the BIOS routine in DOS. Alternatively, a software routine was utilized to identify the presence of a coprocessor and select the appropriate protocol. An example of an appropriate software recognition routine is provided at pages 5–9, 10 of the Intel 80386 reference manual, copyrighted 1987. This routine basically determined the presence of a coprocessor by attempting write and read instructions to the coprocessor and compared the results to determine if the ones and zeros were correctly read and written by the coprocessor. Once the presence of a coprocessor was confirmed, the type of coprocessor was then determined by comparing results of test calculations which produce different results with the 80287 coprocessors than with the 80387 coprocessor. However, certain sequences could cause the processor to lock up awaiting a response from the coprocessor, which would not occur, thus rendering the entire system inoperative.

One example of non-standard installations which became popular was the IBM AT and AT compatible designs. In IBM compatible systems, the ERROR* signal from the coprocessor is not provided as to the coprocessor ERROR* input to the processor, but is instead provided as an interrupt input (IRQ13) to the interrupt control circuitry. Thus in prior art, IBM-compatible systems the ERROR* signal is not available for use to set the ET bit in the processor control register. Furthermore, the utilization of the ERROR* signal to set the ET bit in the 80386 processor has not been accepted by the industry as a reliable means for coprocessor detection.

SUMMARY OF THE INVENTION

The present invention provides a reliable hardware solution to the problem of coprocessor detection in 80386/80387 systems while maintaining full IBM standard compatibility. The invention includes a detection latch circuit which utilizes the 80387 ERROR* output signal and 80386 system RESET* signals as inputs to detect the presence of the 80387 coprocessor. By convention in the industry and as used herein, an asterisk following signal nomenclature indicates the signal is active at a logic low level voltage. Since the 80387 coprocessor ERROR* signal is by design taken to an active low state by the coprocessor for a designated period of time following the trailing, falling edge of the system RESET (the trailing, rising edge of RESET*) the circuit of the present invention detects the presence of the coprocessor by latching the status of the ERROR* signal following reset. This latched value is then provided to a register located in a system integrated circuit device which can be accessed by the processor to determine the presence of a coprocessor. The present invention thus eliminates the need for user operation of a switch and eliminates the possibility of incorrect switch settings which can cause the system to become inoperable.

DESCRIPTION OF THE DRAWINGS

A better understanding of the invention can be obtained when the description of the preferred embodiment is considered in conjunction with the following drawings, in which.

DETAILED DESCRIPTION OF THE PREFERRED EMBODIMENT

Figure 1:
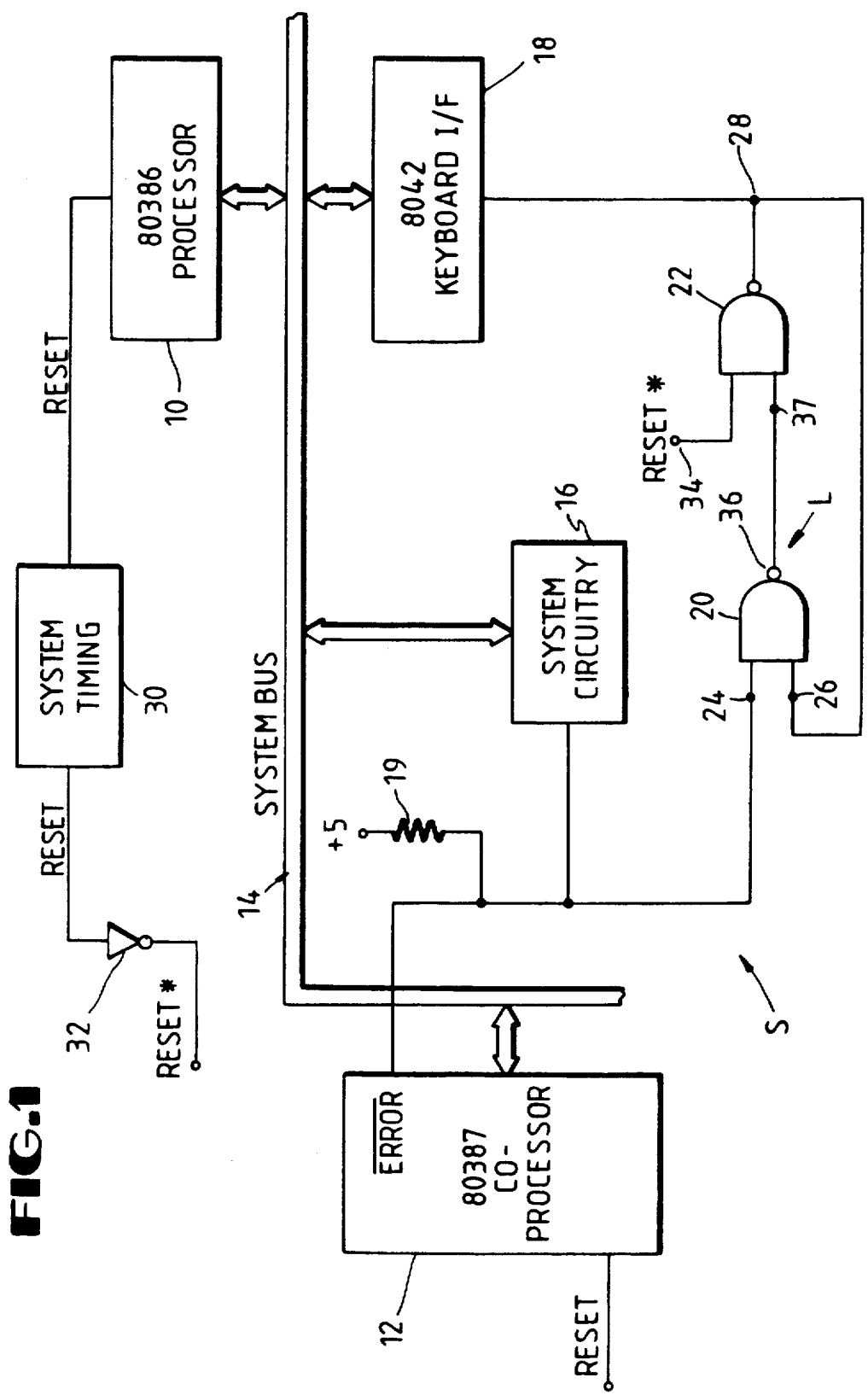
FIG. 1 is a schematic drawing of the circuit elements comprising the present invention and the related typical system elements.

Referring now to FIG. 1, the letter S designates generally a portion of a personal computer system including the present invention. The system S includes a processor 10, a coprocessor 12, a system bus 14, a latch circuit L and system circuitry designated schematically in blocks 16 and 18. Processor 10 is preferably a microprocessor such as the Intel 80386, but any microprocessor capable of interaction with a coprocessor in personal computer applications may be used. Coprocessor 12 is preferably an Intel 80387 companion for the 80386. For the purpose of the claimed invention, the coprocessor 12 may be any coprocessor suitable for use with the selected processor and of the type which provides an active output signal such as the ERROR* output of the 80387 after system reset. System circuitry 16 generally illustrates circuitry in IBM compatible personal computers which interface directly with various coprocessor output signals, such as the ERROR* output, and do not form a part of the present invention. 8042 keyboard interface 18 is a peripheral interface device generally used in IBM standard personal computing systems. The 8042 keyboard interface 18 is coupled to the keyboard (not shown) of the computer system and has other various input and output bits which are utilized in the computer system under processor control. For the purposes of the present invention it is only important that the 8042 keyboard interface 18 include a single-bit addressable buffer for allowing the output signal value of latch circuit L to be read by processor 10 under program control.

Latch circuit L includes NAND gates 20 and 22, interconnected as illustrated in FIG. 1. NAND gate 20 has a first input 24 connected directly to the ERROR* output of coprocessor 12 and a second input 26 connected to the output 28 of NAND gate 22. In normal operation, coprocessor 12 utilizes the ERROR* output to indicate a coprocessor error to the processor. In IBM compatible systems this is treated as an interrupt (IRQ 13) and processed through an interrupt controller designated generally in FIG. 1 as within system circuitry 16. By design, coprocessor 12 takes its ERROR* output signal to an active low state following the trailing falling edge of system RESET signal.

The system RESET signal is generated by a system timing circuit 30 based on inputs (not shown) from portions of the system circuitry 16 and is provided to the processor 10, the coprocessor 12 and other circuitry. In IBM compatible systems, a synchronized RESET* signal is formed by inverting the RESET output from timing circuit 30 by inverter circuit 32. This RESET* signal is utilized for various functions in the system S and is provided as an input signal to NAND gate 22 at input terminal 34. The output 36 of NAND gate 20 is provided to the other input terminal 37 of NAND gate 22.

The present invention detects and latches an active signal on the ERROR* output of coprocessor 12 after system reset, which condition is indicative of the presence of a coprocessor 12, since in the absence of a coprocessor 12 the ERROR* line provided from the coprocessor socket will remain at a high or inactive level due to the presence of pull-up register 19 and will not have an active signal after reset.

Figures 2, 3:
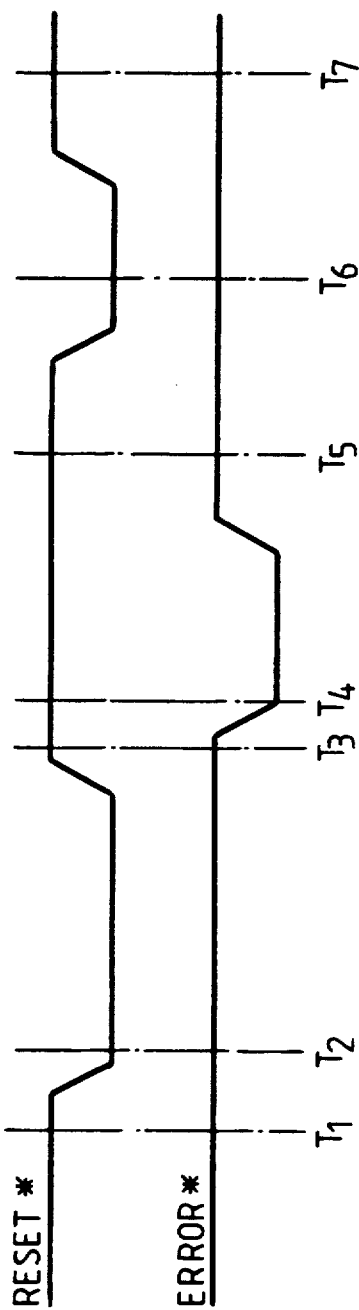
FIG. 2 is a timing diagram illustrating the timing relationship of relevant system signals.
FIG. 3 is a diagram illustrating the logic state of the output of the latch circuit of the present invention at relevant times.

The timing relationship of the ERROR* and RESET* signals are schematically illustrated in FIG. 2. At time $T_1$, before the RESET* signal is active, the voltages at terminals 24 and 34 are a logic high value. The voltage at terminals 26 and 28 are equal at logic high or unconnected levels. The input voltages at terminals 24 and 26 are therefore high and the output voltage at terminal 36 is low.

At time $T_2$, the RESET* signal goes to an active low voltage level at terminal 34, while the ERROR* signal at terminal 24 remains high. Thus both inputs to NAND gate 22 are at logic low levels, the output voltage at terminal 28 remains at a high level, and the output at terminal 36 remains low.

At time $T_3$, the RESET* signal returns to a high level, the output at terminal 36 remains low and the output at terminal 28 remains high. At time $T_4$, the ERROR* signal at terminal 24 goes to an active low state under coprocessor control, causing the output at terminal 36 to go to a logic high level. The inputs 37 and 34 to NAND gate 22 are then both at logic high levels, causing its output at terminal 28 to go to an active low state.

At time $T_5$ the ERROR* signal at terminal 24 returns to an inactive high level, and with input 26 at a low level the output at terminal 36 remains high. With high level inputs at terminals 34 and 36, the output voltage of NAND gate 22 at terminal 28 stays at the low level. This output at terminal 28 will be latched at the low level, until another active RESET* low level input is provided at terminal 34. Thus a low level output voltage at terminal 28 is indicative of the presence of a coprocessor, which is the only way the ERROR* input at terminal 24 is taken to a low level, thus enabling NAND gate 20.

If at time T6 another system reset occurs, the RESET* signal at terminal 34 goes to an active low level, which resets output 28 to a high level. At time T7, after the RESET* signal returns to a high level, output 28 will remain high until an active low level signal is presented at terminal 24 disabling NAND gate 20 and resulting in a high voltage at terminal 36.

Thus the voltage level at terminal 28, which is provided to a single bit buffer in 8042 keyboard interface 18 is reliably indicative of an active signal on the coprocessor ERROR* pin, which occurs only when a coprocessor is present. It should be noted that while the system described detects a logic low level ERROR* signal from the coprocessor circuit, latch circuit L could be readily adapted to detect other active signal changes provided by coprocessors after system reset, whether from the ERROR* output or other output terminals in either positive or negative active mode.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

We claim:

1. An electrical circuit for allowing a processor to detect the presence of a coprocessor in a socket in a personal computer system of the type including a processor operating under program control, the system being of the type adapted to process a coprocessor signal indicating coprocessor operation and a coprocessor signal indicating a coprocessor fault via a system interrupt controller interfacing between the coprocessor and the processor, wherein the coprocessor operation signal is asserted only when the coprocessor is performing an operation, and wherein the coprocessor fault signal is asserted after faults in requested operations and for a period after assertion of a momentary system reset signal, the processor program control including a control sequence which causes the processor to initialize the system to reflect system configuration in response to the system reset signal, the momentary system reset signal being provided to the various system components to cause an initialization of the system, said system initialization sequence including detecting the presence of a coprocessor in the socket, wherein the coprocessor activates the coprocessor fault signal at a socket terminal in response to the momentary system reset signal and the occurrence of a fault in a requested operation, the circuit comprising:
   a) a latch circuit receiving the momentary system reset signal as a first input signal, said latch circuit being connected to receive a second input directly from the coprocessor fault signal terminal of the coprocessor socket, said latch circuit not receiving said coprocessor operation signal;
   b) said latch circuit including means for detecting an active output signal from the coprocessor fault signal socket terminal following the occurrence of the momentary system reset signal; and
   c) said latch circuit including means of generating a latch circuit output signal indicative of the detection of an active coprocessor fault signal from the coprocessor following system reset, thus indicating the presence of a coprocessor.

2. The circuit of claim 1, further comprising:
   d) means for buffering the output signal from said latch circuit.

3. The circuit of claim 2, further comprising:
   means associated with said processor for reading the buffered output signal from said latch circuit following system reset.

4. The circuit of claim 2, wherein said means for buffering the output signal from said latch circuit output signal comprises an addressable buffer which may be read by the microprocessor under program control.

5. The circuit of claim 1, wherein the momentary system reset signal is a negative value pulse signal.

6. The circuit of claim 1, wherein the coprocessor fault signal from the coprocessor is a negative value pulse signal.

7. An electrical circuit for allowing a processor to detect the presence of a coprocessor in a socket in a personal computer system of the type including a processor operating under program control, the system being of the type adapted to process a coprocessor signal indicating coprocessor operation and a coprocessor signal indicating a coprocessor fault via a system interrupt controller interfacing between the coprocessor and the processor, wherein the coprocessor operation signal is asserted only when the coprocessor is performing an operation, and wherein the coprocessor fault signal is asserted after faults in requested operations and for a period after assertion of a momentary system reset signal, the processor program control including a control sequence which causes the processor to initialize the system to reflect system configuration in response to the system reset signal, the momentary system reset signal being provided to the various system components to cause an initialization of the system, said system initialization sequence including detecting the presence of a coprocessor in the socket, wherein the coprocessor activates the coprocessor fault signal at a socket terminal in response to the momentary system reset signal and the occurrence of a fault in a requested operation, the circuit comprising:
   a) a latch circuit receiving the momentary system reset signal as a first input signal, said latch circuit being connected to receive a second input directly from the coprocessor fault signal terminal of the coprocessor socket;
   b) said latch circuit including means for detecting an active output signal from the coprocessor fault signal socket terminal following the occurrence of the momentary system reset signal; and
   c) said latch circuit including means of generating a latch circuit output signal indicative of the detection of an active coprocessor fault signal from the coprocessor following system reset, thus indicating the presence of a coprocessor, wherein said latch circuit comprises:
   a first NAND gate having first and second input terminals, and an output terminal, said first input being connected directly to the coprocessor fault signal terminal of the coprocessor socket;
   a second NAND gate having first and second input terminals and an output terminal, said first input terminal being connected to receive the momentary system reset signal, said second input terminal being connected to said output terminal of said first NAND gate, and said output terminal of said second NAND gate being connected to said second input terminal of said first NAND gate; and
   said output terminal of said second NAND gate providing said latch circuit output signal indicative of the presence of a coprocessor.

* * * * *